(No Model.)

2 Sheets—Sheet 1.

C. C. CRUMB.
SURFACE CULTIVATOR AND PULVERIZER.

No. 440,993.

Patented Nov. 18, 1890.

WITNESSES:

INVENTOR:

BY

ATTORNEYS.

(No Model.) 2 Sheets—Sheet 2.

C. C. CRUMB.
SURFACE CULTIVATOR AND PULVERIZER.

No. 440,993. Patented Nov. 18, 1890.

WITNESSES:
D. C. Reusch
C. Sedgwick

INVENTOR:
C. C. Crumb
BY Munn & Co.
ATTORNEYS.

UNITED STATES PATENT OFFICE.

CHARLES C. CRUMB, OF BURLINGAME, KANSAS.

SURFACE CULTIVATOR AND PULVERIZER.

SPECIFICATION forming part of Letters Patent No. 440,993, dated November 18, 1890.

Application filed December 26, 1889. Serial No. 335,086. (No model.)

*To all whom it may concern:*

Be it known that I, CHARLES C. CRUMB, of Burlingame, in the county of Osage and State of Kansas, have invented a new and useful Improvement in Surface Cultivators and Pulverizers, of which the following is a full, clear, and exact description.

My invention relates to an improved surface cultivator and pulverizer, and has for its object to provide an implement of exceedingly simple and durable construction, which will effectually remove all weeds from the surface of the ground, and will pulverize and leave the soil fine and mellow.

A further object of the invention is to provide an implement in which the pulverizing or cultivating surfaces are interchangeably arranged, thus permitting the soil to be thrown toward or away from the plants, as desired, and also to so construct the implement that the handles may be manipulated to quickly and conveniently adapt the implement to any irregularities in the width of the rows.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1:
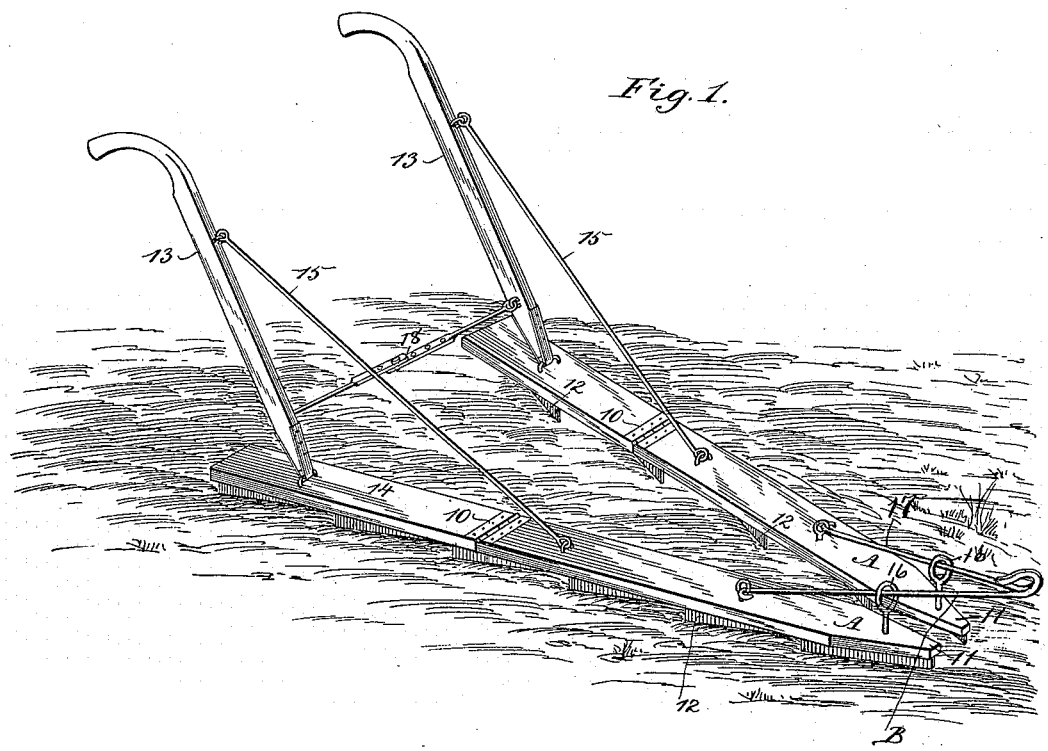
Figure 2:
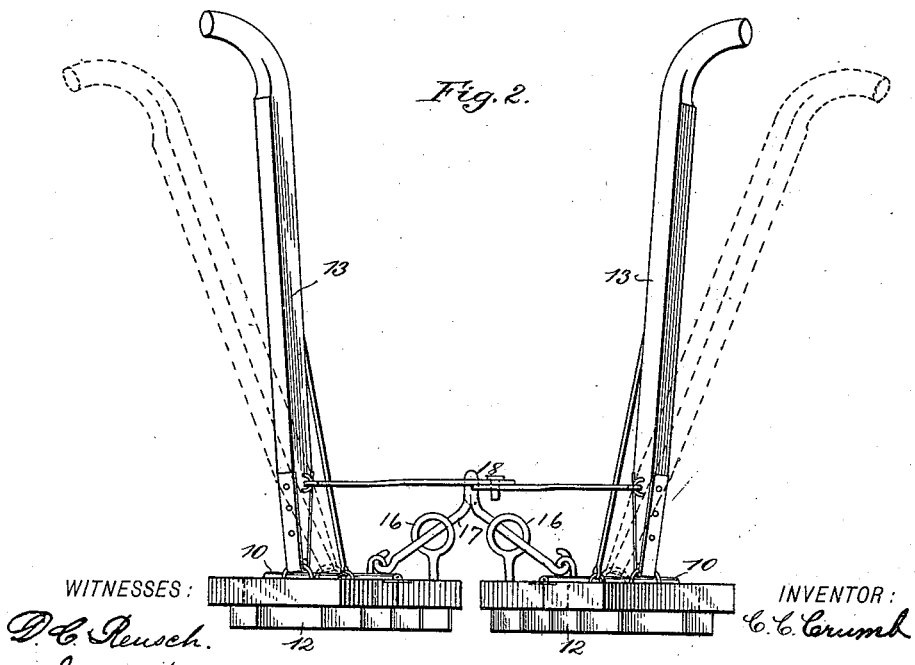
Figure 3:
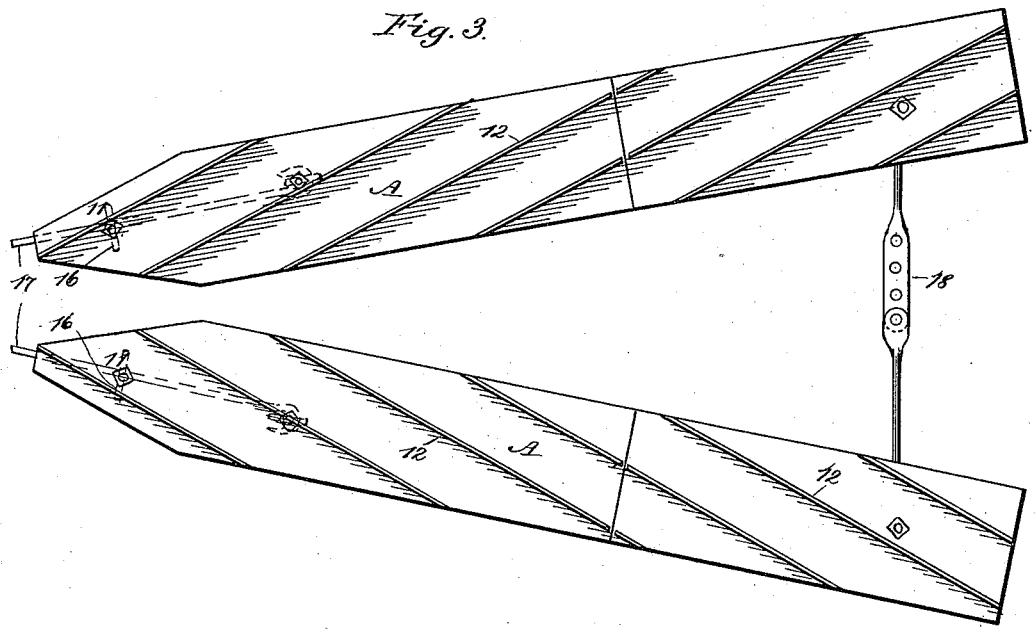
Figure 4:
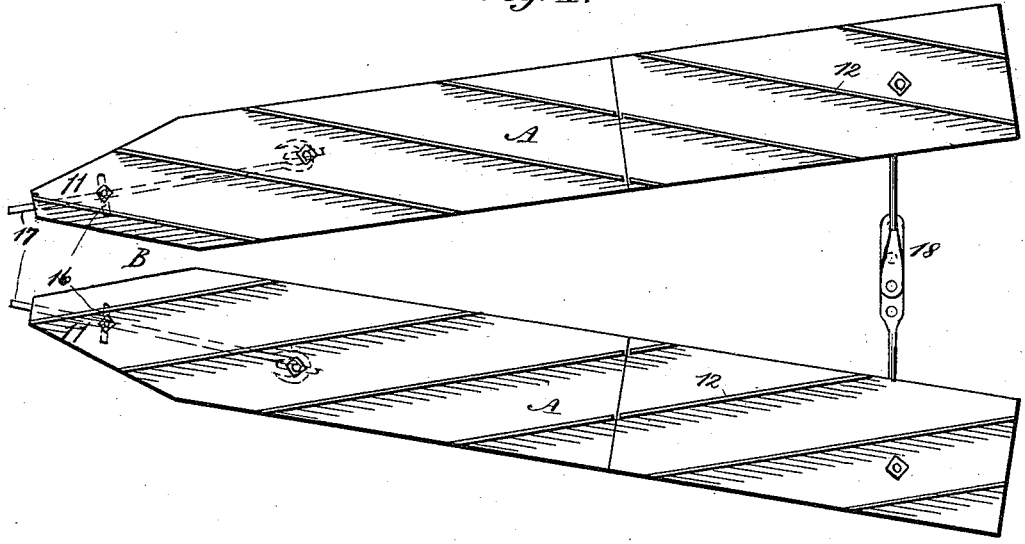

Figure 1 is a perspective view of the implement. Fig. 2 is a rear elevation of the same. Fig. 3 is a bottom plan view illustrating the cultivating and pulverizing surfaces arranged to throw the dirt from the plants; and Fig. 4 is a similar view to Fig. 3, the cultivating and pulverizing surfaces being arranged to supply dirt to the plants.

The body of the implement consists of two frames A, which may be made solid, as shown in the drawings, or of skeleton form, as desired. The said body-frames may be constructed of either wood or metal, as may be found best adapted for the purpose. Each body-frame A is preferably divided into two sections, one section being hinged to the other, as best illustrated at 10 in Fig. 1.

The toe or forward portion of the body-frames A is preferably made essentially pointed, as illustrated at 11, and upon the under surface of each body-frame a series of blades 12 is longitudinally arranged. The blades 12 are placed at predetermined intervals apart, and are made to extend perpendicularly downward from the body-frames from about one-half an inch or one and one-half inch, as desired, and a sufficient number of these blades are ordinarily employed to extend from end to end of the frames, as best shown in Figs. 3 and 4.

Upon the upper surface of each body-frame near the heel or rear thereof, a handle 13 is pivoted, the pivotal connection being usually effected by passing a staple or eye 14, secured in the body-frame, through an eye formed at the lower extremity of the handle. Each handle is held at a proper rearward inclination by means of a rod 15, pivotally attached or hinged at one end to the handle at or near the upper end, the other extremity of the rod being attached in like manner to the body-frame.

The two body-frames A are united at their forward ends by a link-connection B, which connection is detachable, and usually consists of two eyes 16—one secured in the nose of each frame—and an essentially V-shaped draw-bar 17, detachably attached at its rear ends to the frames at the rear of the eyes 16, the forward end of the draw-bar being bent to hook shape for attachment to a singletree or doubletree.

The handles 13 of the implement are connected by a sectional stay-rod 18, the outer ends of said rods being pivotally attached to the opposed handles, as best illustrated in Fig. 2, and their inner ends are adjustably secured to each other, whereby the handles may be given any desired lateral inclination.

It will be observed that by reason of the pivotal attachment of the handles to the body-frames and the pivotal connection of the handles to one another, the body-frame as the implement is advanced may be thrown laterally outward or inward, as the width of the rows may require for successful cultivation, by simply carrying the handles outward in opposite directions or inward toward each other, the said rod 18 in which event acting as a fulcrum.

As the two body-frames are changeably connected, and as the blades of each body-frame are diagonally arranged, the said body-frames may be shifted to throw the dirt toward or away from the plants, as desired. When the two body-frames are connected, as illustrated in Fig. 3, as the implement is drawn forward the dirt will be carried from the plants as pulverized by reason of the fact that the opposed blades of the frames approximate in contour the letter A, the base of which is in the direction of the heel of the implement, and when the body-frames are arranged, as shown in Fig. 4, to throw the dirt to the plants, the base of the A is in the direction of the front of the implement. In changing the frames the draw-bar is detached, likewise the handles, and when the position of the frames has been shifted the handles and draw-bar are replaced.

I desire it to be understood that the manner of attaching the two sections together at the front and also the application of the draft to the sections may be changed, if in practice it is found advisable.

Having thus described my invention, I claim as new and desire to secure by Letters Patent—

1. A surface-cultivator comprising the two flat interchangeable side frames or boards provided on their lower faces with oblique narrow parallel blades the ends of which terminate at the edges of the boards or frames, the lower edges of the blades being straight, whereby when the two frames are placed in one position the soil will be pulverized and thrown to the plants, and when interchanged the soil will enter the open spaces between the outer ends of the blades and be thrown away from the plants, substantially as set forth.

2. A surface-cultivator comprising the two flat interchangeable side frames or boards provided on their upper sides at their rear ends with handles hinged or pivoted at their lower ends thereto and connected above their pivotal points by links, and the brace-rods connecting the handles above their pivotal points with the boards or frames in advance thereof, and the blades on the lower sides of said frames, substantially as set forth.

3. In an implement of the class described, the combination, with two body-frames formed in two sections hinged at 10 and interchangeably connected at their forward ends, of a series of blades secured to the under surfaces of said frames and extending diagonally from side to side, substantially as shown and described.

4. In an implement of the class described, the combination, with two body-frames interchangeably linked together at their forward extremities and divided transversely at 10 into hinged sections, of a series of transversely-arranged blades attached to the under surfaces of the body-frames, a handle pivotally attached to each body-frame near its rear end, and a detachable link-connection between the handles of the frame, substantially as and for the purpose specified.

CHARLES C. CRUMB.

Witnesses:
R. DUNMIRE,
W. G. WILLIAMS.